(12) United States Patent
Ono

(10) Patent No.: US 8,011,497 B2
(45) Date of Patent: Sep. 6, 2011

(54) SEAL CHAIN HAVING GREASER

(75) Inventor: Takuma Ono, Kaga (JP)

(73) Assignee: Daido Kogyo Co., Ltd., Ishikawa Pref. (JP)

( * ) Notice: Subject to any disclaimer, the term of this patent is extended or adjusted under 35 U.S.C. 154(b) by 507 days.

(21) Appl. No.: 11/991,273

(22) PCT Filed: Sep. 9, 2005

(86) PCT No.: PCT/JP2005/016661
§ 371 (c)(1),
(2), (4) Date: Jan. 8, 2009

(87) PCT Pub. No.: WO2007/029336
PCT Pub. Date: Mar. 15, 2007

(65) Prior Publication Data
US 2009/0301842 A1    Dec. 10, 2009

(51) Int. Cl.
*F16G 13/00* (2006.01)
(52) U.S. Cl. ............ 198/851; 198/500; 198/852; 474/91
(58) Field of Classification Search .................. 198/500, 198/851, 852; 474/91, 206; 384/127; 184/15.1
See application file for complete search history.

(56) References Cited

U.S. PATENT DOCUMENTS

| | | | | |
|---|---|---|---|---|
| 4,995,852 A | * | 2/1991 | Takahashi et al. | 474/91 |
| 5,222,920 A | * | 6/1993 | Cheesman et al. | 474/213 |
| 5,412,934 A | * | 5/1995 | Furuyama | 59/78 |
| 5,425,679 A | * | 6/1995 | Utz | 474/91 |
| 5,468,376 A | * | 11/1995 | Bates | 210/160 |
| 6,098,787 A | * | 8/2000 | Murano | 198/500 |
| 6,244,426 B1 | * | 6/2001 | Murano et al. | 198/784 |
| 6,311,469 B1 | | 11/2001 | Christmas | |
| 6,755,295 B2 | * | 6/2004 | Weskamp et al. | 198/500 |
| 6,938,732 B2 | * | 9/2005 | Garbagnati | 184/15.1 |
| 7,520,379 B2 | * | 4/2009 | Frost et al. | 198/851 |

FOREIGN PATENT DOCUMENTS

| | | |
|---|---|---|
| DE | 432660 | 8/1926 |
| EP | 0 520 138 | 12/1992 |
| JP | 54-44380 | 4/1979 |
| JP | 54-31752 | 10/1979 |
| JP | 2001-505984 | 5/2001 |
| JP | 2002-160818 | 6/2002 |
| JP | 2003-314628 | 11/2003 |

OTHER PUBLICATIONS

International Search Report issued Oct. 11, 2005 in the International (PCT) Application of which the present application is the U.S. National Stage.

* cited by examiner

*Primary Examiner* — Douglas Hess
(74) *Attorney, Agent, or Firm* — Wenderoth, Lind & Ponack, L.L.P.

(57) ABSTRACT

A greasing through hole is perforated through one outer link plate, and greasing device is attached to the through hole. Degreasing through-holes are perforated through an outer link plate or an inner link plate on the side distant from the outer link plate with a bearing section A between the link plates, and degreasing device 22 is attached to those through-holes. Lubricant injected from the greasing device is supplied to the bearing section A through a gap c between the sealing device and the outer link plate, and used lubricant within the bearing section A is discharged out of the degreasing device through another gap c.

10 Claims, 8 Drawing Sheets

SEAL CHAIN HAVING GREASER

TECHNOLOGICAL FIELD

The present invention relates to a conveyor or power transmission seal chain and more specifically to a seal chain suitable especially as a conveyor seal chain. Specifically, the invention relates to a seal chain having a greaser for supplying lubricant such as grease and oil to a bearing section sealed by sealing means.

BACKGROUND ART

Hitherto, sealing means 6 is disposed between an inner link plate 2 and an outer link plate 3 so as to surround a bushing 5 in a seal chain 1' as shown in FIG. 8 for example. Lubricant such as grease is sealed in a bearing section A composed of the bushing 5 and the pin 7 by the sealing means to keep flexibility of the chain smooth for a long period of time on the basis of relative rotation of the bushing 5 and the pin 7. Because dust caused by bulk materials such as grains, coals, iron ores, lime and salt readily invade into the bearing section A in the unloading seal chain 1' such as a bucket conveyor for conveying such bulk materials, there has been proposed to provide two rows of sealing members 6A and 6B having O-rings 12 and 13 that contact the inner and outer link plate 2 and 3, respectively, and metallic holding plates 15 and 16 for holding the O-rings (see JP Patent Application Laid-open No. 2002-160818).

As shown in FIG. 8, the seal chain 1' is provided with a greaser 11 having an oil orifice 9 of a predetermined length perforated through the center of the pin 7 in a longitudinal direction from one end face of the pin 7, a grease nipple 10 attached at an opening of the hole and communication holes 9a (the oil orifice 9 and the communication holes 9a will be referred to as greasing holes or greasing paths hereinafter) formed toward the bearing section A from the grease orifice. Then, the greaser 11 supplies grease or the like to the bearing section A through the relatively long greasing holes 9 and 9a from the grease nipple 10 at one end face of the pin 7. Furthermore, in order to prevent the O-rings 12 and 13 of the sealing member from bursting by greasing pressure in supplying grease, the ringed holding member 15 or 16 of the sealing member is provided with an oil groove (or gap) formed into a shape of concave groove or the like for releasing the pressure (not shown).

In replenishing grease or the like by the greaser 11, there has been a case when the grease or the like solidifies on the way of the greasing path, thus clogging the greasing paths 9 and 9a and disabling the supply of the grease, because the greasing paths 9 and 9a are long in the prior art seal chain 1'. This phenomenon is apt to occur in a large conveyor chain whose greasing path is long and which is not greased so often and therefore the grease stays at the bearing section and is apt to solidify due to chemical changes such as deterioration.

Furthermore, because the prior art seal chain 1' has the oil groove or the gap for releasing the greasing pressure, it is unable to completely seal the bearing section A by the sealing means. Therefore, the lubricant always leaks from the bearing section A, requiring operations of replenishing the lubricant by the greaser 11 relatively soon and of cumbersome maintenance. Furthermore, there is a case of bursting the sealing means because the large pressure is apt to act on the basis of the long greasing paths in replenishing the grease or the like from the greaser 11, and the oil groove or the like described above is unable to release the large pressure that acts suddenly.

Still more, because the greasing holes 9 and 9a are formed within the pin 7 on which large bending and shearing stresses act during when the seal chain 1' is in operation, there is a risk of damaging the pin 7 due to concentration of stresses. In order to avoid such risk, pins having a large diameter are used in designing the seal chain. Along that, however, the seal chain requires bushings and rollers having a large diameter and due to that, also requires link plates having a large thickness or width, hindering lightening and cost-down of the chains.

SUMMARY OF THE INVENTION

Accordingly, it is an object of the invention to provide a seal chain that allows lubricant to be replenished directly to a lubricant holding part that is sealed by sealing means and that thereby solves the aforementioned problems.

The present invention is characterized in that in a seal chain (1, 1 . . . ) in which an outer link (17) has a pair of pins (7, 7), and outer link plates (3, 3) coupled by these pins are alternately linked with an inner link (18) having a pair of bushings (5, 5). Inner link plates (2, 2) are coupled by these bushings by inserting the pins through the bushings, and sealing means (6, 6) are interposed between the outer link plate and the inner link plate so as to seal lubricant to a bearing section composed of the pin and the bush.

A greasing through hole ($20_1$) is perforated through the outer link plate ($3_1$) so as to communicate with the bearing section (A). Greasing means (21) capable of supplying the lubricant from the side of an outer face of the outer link plate to the bearing section is attached to the through hole.

Thereby, the lubricant is supplied to the bearing section directly and efficiently because the greasing path from the greasing means to the bearing section is short. Furthermore, faults in greasing to the bearing section may be reduce because clogging of greasing holes due to solidification of the lubricant such as grease hardly occurs.

Furthermore, degreasing through holes ($20_2$, $20_3$, $20_4$) are perforated through the outer link plate ($3_2$: see FIGS. 1, 6 and 7 for example) or through an inner link plate ($2_2$: see FIGS. 4 and 5 for example) on the side separated from the greasing means (21) with the bearing section A between. Degreasing means (22) for discharging the lubricant within the bearing section when lubricant is supplied from the greasing means (21) is attached to the through hole.

Thereby, it becomes easy to discharge the used lubricant within the bearing section out of the degreasing means, to replace with the new lubricant in the bearing section when the lubricant is supplied by the greasing means and to maintain the lubricant performance of the bearing section of the seal chain for a long period of time. Furthermore, because pressure applied in injecting the lubricant from the greasing means is released from the degreasing means and no excessive pressure acts on the sealing means, it becomes possible to prevent a failure (such as a burst of the sealing means) from occurring.

Furthermore, the provision of the degreasing means makes it possible to eliminate a releasing groove or gap from the sealing means that have been necessary in the prior art chain, to reduce a leak of lubricant during normal use, to keep the lubricant in the bearing section for a long period of time, and to prolong maintenance intervals.

It is noted that while the words "greasing means" and "degreasing means" have been used because grease is generally used as the lubricant, it is possible to use oil and the like other than grease as the lubricant. Accordingly, the words "greasing" or "degreasing" in the invention are not necessarily meant to limit the invention only to grease.

Furthermore, the greasing and/or degreasing through holes (20, . . . ) are disposed at parts between the pair of pin holes (3a) of the outer link plate (3) and within a width of diameter (D) of the pin hole (see FIG. 2) or at parts between bush holes (2a) of the inner link plate (2) and within a width of diameter (D) of the bushing (see FIG. 4).

The parts of the through holes of both of the outer link plate and inner link plate are parts distant from a region to which compressive concentrated stress of the pin hole or bush hole acts and from a least profile part that is liable to become a rupture face due to tensile force acting on the chain and are parts less influenced by plate strength. Therefore, strength of the link plate will not drop due to the through holes. Thereby, it provides advantages in terms of strength and machining as compared to those of the prior art in which greasing hole is perforated through a pin. Then, it becomes possible to lighten the seal chain and to lower the cost thereof.

Specifically, as shown in FIGS. 1, 4 and 5 for example, the bushing (5) is coupled with the inner link plate by protruding a certain degree out of the outer face of the inner link plate (2), and the sealing devices (6, $6_2$) has two rows of sealing members (6A, 6B) arranged in a radial direction so as to surround the protruding portion (5a) of the bushing. The inner and outer diametric sealing members (6A, 6B) have O-rings (12, 13) and ringed holding members (15, 16) for holding the O-rings, respectively. The inner and outer diametric holding members abut from each other so as to keep the O-rings in contact with the inner and outer link plates, the sealing devices (6, $6_2$) are positioned in a chain width direction (longitudinal direction of the pin) and are disposed so that a predetermined gap (c) exists between the back face of its holding member and the inner face (b) of the outer link plate (3) (see FIG. 1) or between an outer face (f) of the inner link plate ($2_2$, $22_3$) (see FIGS. 4 and 5).

Furthermore, as shown in FIGS. 6 and 7, a ringed concave groove (27) is formed on the side of the outer diameter of the greasing and degreasing through holes (20, . . . ) on the inner face (b) of the outer link plate (3). The sealing device ($6_3$) has a ringed plate member (25) and an O-ring (26) held by the concave groove (27) of the outer link plate, and the O-ring is arranged so as to contact with the plate member so that a certain gap (c) is created between the plate member (25) and the inner face of the outer link plate (3).

Thereby, the lubricant injected from the greasing device (21) is supplied to the bearing section (A) through one gap (c), and the used lubricant within the bearing section (A) is discharged out of the degreasing device (22) through the other gap (c).

It is noted that the O-ring is a sealing member having a circular shape (ringed, O-shaped) made of elastic material such as rubber. It has a sectional shape that is not limited to being circular (O-shape), and may have a lip such as a shape of X, a shape of V, a shape of U, and a shape of W.

Furthermore, as shown in FIG. 7 for example, it is possible to provide a roller sealing device (32) for sealing lubricant in a bearing section (B) of a roller (19) and to create through holes through the bushing (5) to communicate the bearing section (A) for bending of the chain with the roller bearing section (B).

It is noted that while the reference numerals within the parentheses are provided for the purpose of collating with the drawings, they will not affect the description of the Claims at all.

DETAILED DESCRIPTION OF THE INVENTION

Figure 1:
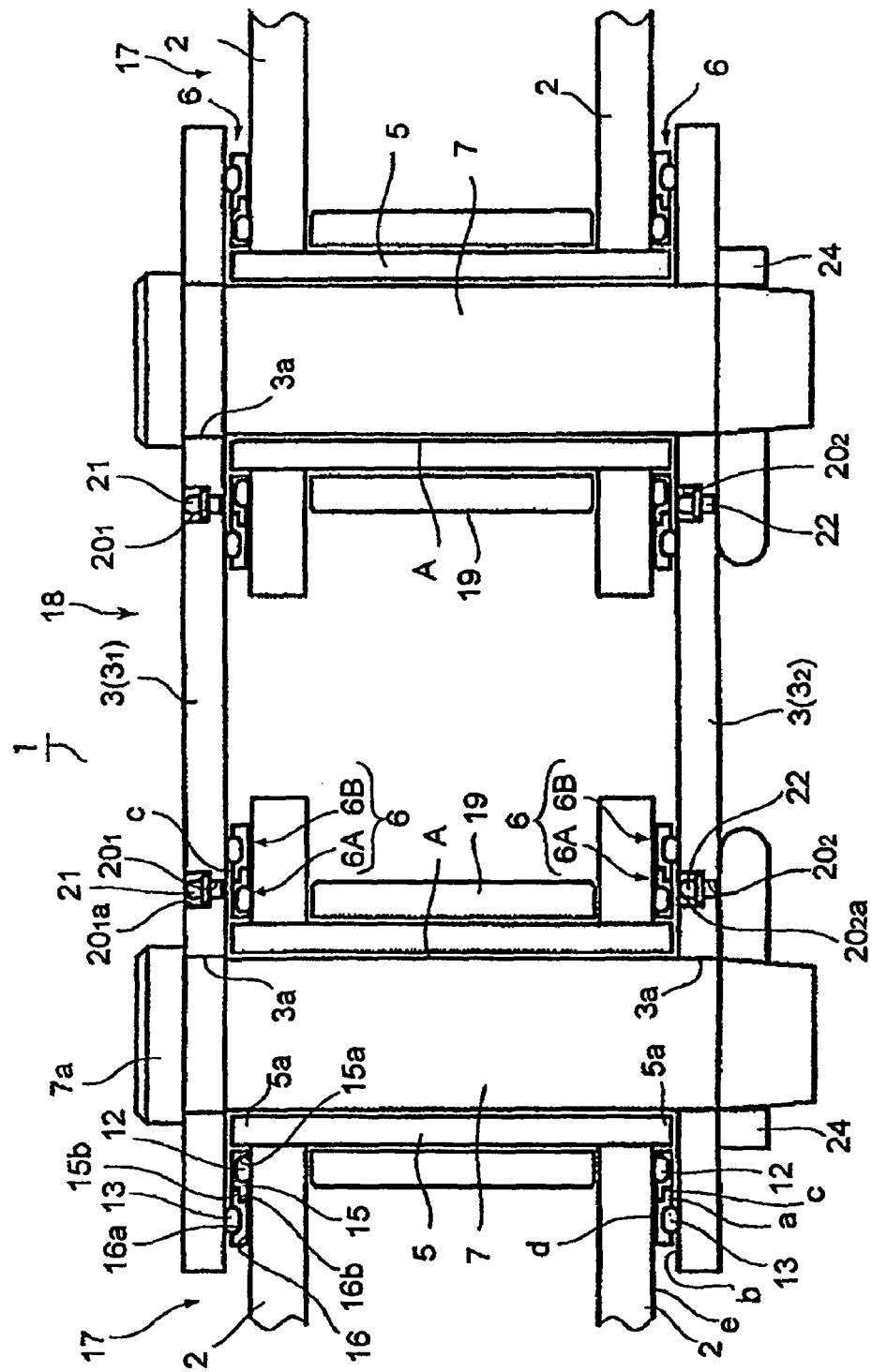
FIG. 1 is a section view showing a seal chain of the present invention.
Figure 2:
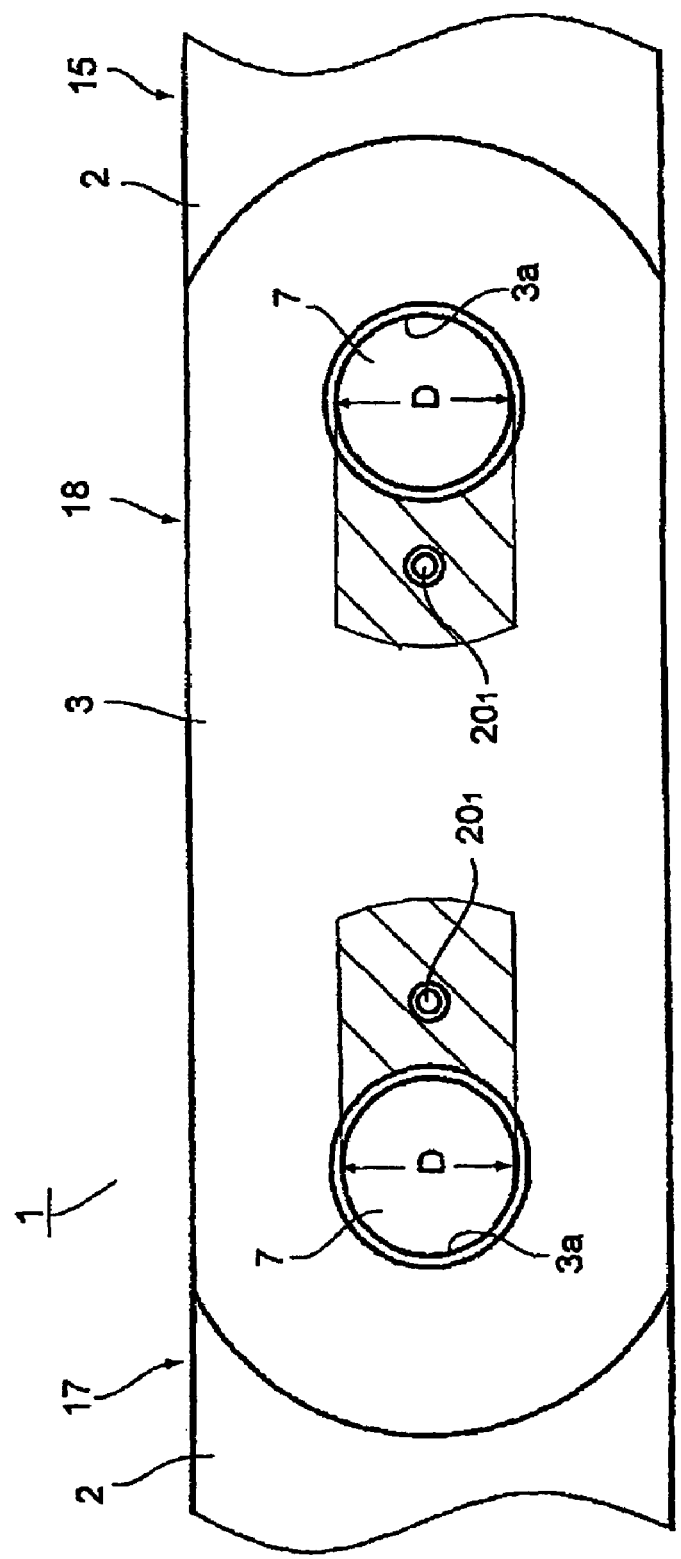
FIG. 2 is a front view thereof.
Figure 3:
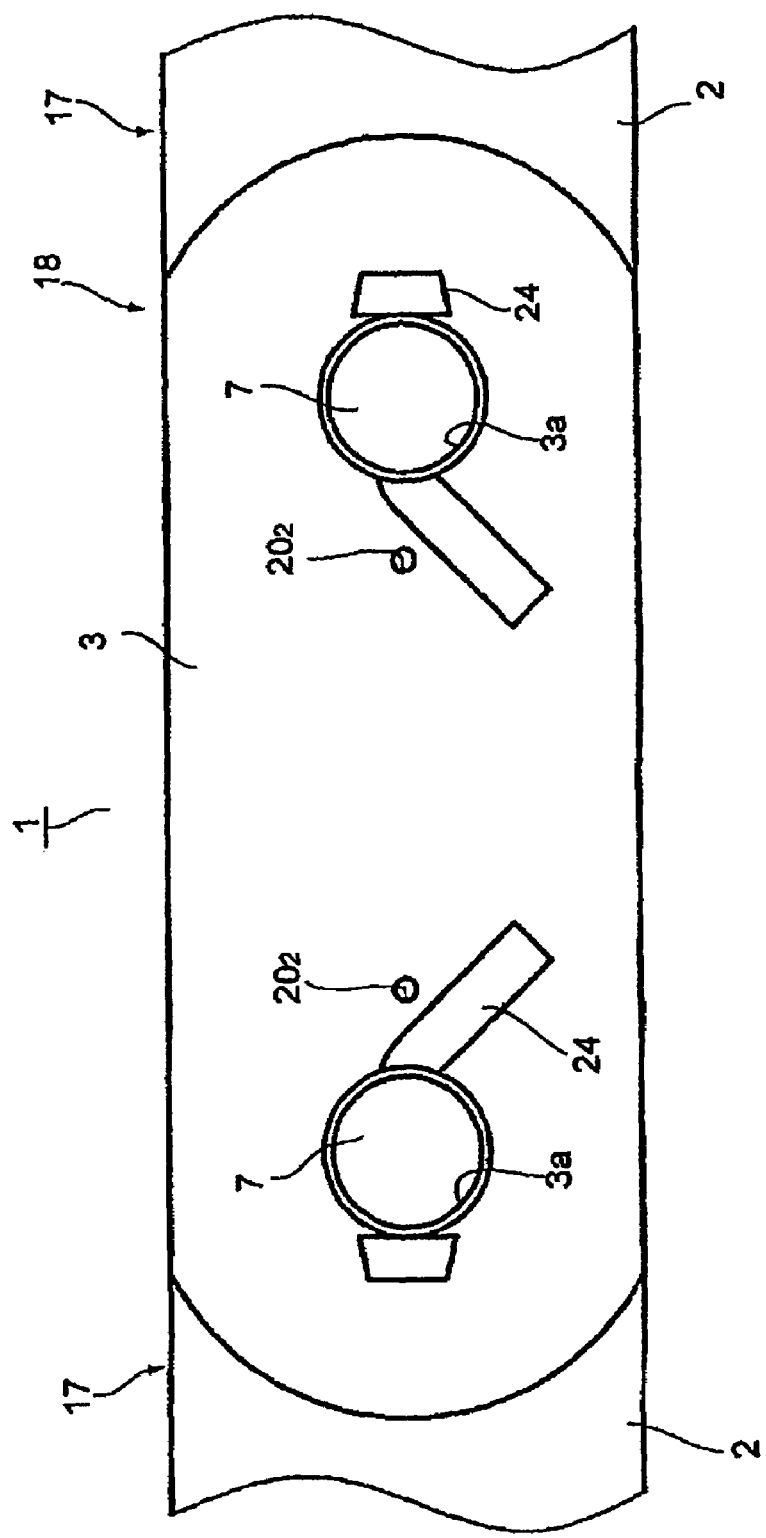
FIG. 3 is a back view thereof.

An embodiment of a seal chain of the invention applied to a continuous unloading conveyor chain will be explained below. As shown in FIGS. 1 through 3, the seal chain 1 is composed of inner links 17, in which both ends of two inner link plates 2 and 2 are coupled by a pair of bushings 5 and 5, and outer links 18, in which both ends of two outer link plates 3 and 3 having the same shape are coupled by a pair of pins 7 and 7. A roller 19 is idly and rotatably fitted with the pin 7. Then, the chain is constructed by idly fitting the pin 7 into the bushing 5 to alternately and endlessly link the inner link 17 and the outer link 18. The pin 7 has a head 7a having a large diameter at one end thereof, and has a tapered other end through which a through hole is perforated. The pin 7 is inserted through a pin hole 3a of one outer link plate $3_1$ and penetrates through the bushing 5 such that its edge protrudes out of a pin hole 3a of the other outer link plate $3_2$. Then, a cotter pin 24 is inserted into the aforementioned through hole so that the pin will not come off.

Both ends of the bushing 5 protrude out of the inner link plates 2 by a certain degree, and the sealing devices 6 and 6 are interposed between the inner link plate 2 and the outer link plate 3 so as to surround the protruding portions 5a and 5a of the bushing. The seal chain 1 freely bends by a bearing section A arranged between the pin 7 and the bushing 5 so that the inner link 17 and the outer link 18 relatively rotate. The sealing device 6 maintains the bending of the chain smoothly for a long period of time by sealing the lubricant such as grease supplied to the bearing section A and by preventing dust and other material from invading from the outside.

The sealing device 6 is composed of sealing members 6A and 6B disposed in two rows in a radial direction. Each one has an O-ring 12 or 13 made of an elastic member such as rubber and a holding member 15 or 16 for holding the O-ring. These holding members 15 and 16 are made of metallic ringed members and have ringed concave grooves 15a and 16a formed for holding the O-rings, respectively, on different sides thereof. For example, the concave grooves are formed by implementing a soft nitriding treatment (Tufftride treatment) on steel members such as chromium-molybdenum steel (e.g., SCM435 or SCM440) for the purposes of surface hardening and rust-prevention. It is noted that the materials are not limited to those described above, and fluorine coating may be also implemented. Furthermore, although self-lubricant materials such as synthetic resin, oil impregnated sintered metal, bronze, phosphor bronze, linarite and others may be used, it is preferable to use low frictional materials including steel on which the Tufftride treatment has been implemented as described above. It is also noted that O-rings 15 and 16 are not limited to those having a circular shape in section, and may have other sectional shapes such as a shape of X in section (X-ring), a shape of V in section (V-ring), a shape of U in section (U-ring) and a shape of W in section (W-ring).

The inner diametric sealing member 6A is arranged so that the O-ring 12 contacts the inner link plate 2, and the outer diametric sealing member 6B is arranged so that the O-ring 13 contacts the outer link plate 3. Both holding members 15 and 16 have respective abutting faces 15$b$ and 16$b$ that abut each other so as to maintain the contact of the O-rings. That is, the inner diametric holding member 15 has a flange that is flush with a face having the O-ring holding concave groove 15$a$ (the face facing to the inner link plate 2), that has a thickness of about a half of the main portion with groove 15$a$, and that protrudes in an outer diametric direction. The outer diametric holding member 16 has a flange that is flush with a face having the O-ring holding concave groove 16$a$ (the face facing to the outer link plate), that has a thickness of about a half of the main portion with groove 16$a$, and that protrudes in an inner diametric direction. Both flanges abut each other, composing the abutting faces 15$b$ and 16$b$ described above.

The inner and outer diametric sealing members 6A and 6B are integrated in a width direction of the chain (in a longitudinal direction of the pin) by the abutment of the abutting faces 15$b$ and 16$b$ described above. Furthermore, the O-ring holding concave groove 16$a$ of the outer diametric holding member 16 is formed to be deeper than the inner diametric holding concave groove 15$a$, so that a predetermined gap c is created between a face a of both holding members 15 and 16 that are arranged so as to be substantially flush on the side of the outer link plate and an inner face b of the outer link plate 3. It is noted that a slight gap is created between a face d of both holding members 15 and 16 that are substantially flush on the side of the inner link plate and an outer face e of the inner link plate 2.

Then, greasing or degreasing through holes $20_1$ or $20_2$ are formed through apart of the outer link plate 3 communicating with the bearing section A, or more specifically through the part on the inner diametric side of the outer diametric O-ring 13 or more preferably through the part corresponding to the gap c. These through holes 20 have counter bores $20_1a$ and $20_2a$ having a large diameter and formed to a middle part of the thickness of outer link plate 3 from one side. As shown in detail in FIGS. 2 and 3, one outer link plate $3_1$ is assembled such that the counter bore $20_1a$ faces the outer face of the plate, and the other outer link plate is assembled such that the counter bore 20$a$ faces the inner face of the plate. Both outer link plates $3_1$ and $3_2$ are the same ones, and the through holes $20_1$ and $20_2$ having the counter bores $20_1a$ and $20_2a$ are disposed at parts between the pin holes 3$a$ and within a chain width of the pin holes having a diameter D (slanted line parts in FIG. 2). These parts are parts distant from parts where the outer link plate 3 may cause a rupture due to tensile force acting on the seal chain 1 (i.e., parts distant from weak parts in strength where stress is concentrated from around a least profile of the pin hole of the link plate in a longitudinal direction of the plate), and are parts where the through holes $20_1$ and $20_2$ may not become starting points of rupture and other damage.

A grease nipple 21 composing the greasing device is attached to the counter bore $20_1a$ opening to the outer face of the outer link plate $3_1$, and degreasing device 22 is attached to the counter bore $20_2a$ opening to the inner face of the other outer link plate $3_2$. The greasing grease nipple 21 has a check valve for preventing the flow of grease to the outside from the bearing section A side (grease sealing side). The check valve enables one to inject the grease or the like to the bearing section side by effecting predetermined pressure by a grease gun. Furthermore, the same grease nipple with the greasing device described above is used for the degreasing device 22. A check valve is disposed also in the degreasing grease nipple 22 so as to stop a flow from the outside to the bearing section A side. The check valve opens when pressure of used grease within the bearing section A increases to a predetermined pressure due to the injection of grease from the greasing device, and discharges the used grease within the bearing section A.

When the same grease nipples are used for the greasing device 21 and the degreasing device 22, it becomes easy to manage and to assemble the parts because the same one may be used for one and the other outer link plates $3_1$ and $3_2$. However, it is not necessary to always use the same ones. For example, a nipple that opens at a lower pressure than the greasing device 21 may be used for the degreasing device 22 by taking fluid resistance of the grease within the bearing section A into account.

Because the seal chain 1 is constructed as described above, lubricant such as grease is filled into the bearing section A, and the sealing devices 6 and 6 seal it. Accordingly, the lubricant rotates the pin 7 and the bushing 5 of the bearing section A relatively and smoothly, thus keeping smooth bending of the inner and outer links 17 and 18 in the seal chain 1. At this time, the inner diametric sealing member 6A turns in a body with the inner link plate 2 because the O-ring 12 made of rubber having a high friction constant contacts the inner link plate 2, and the outer diametric sealing member 6B turns in a body with the outer link plate 3 because the O-ring 13 contacts with the outer link plate 3.

Thereby, although the inner and outer holding members 15 and 16 relatively rotate at the abutting faces 15$b$ and 16$b$, these holding members 15 and 16 are made of hard materials such as metal, and the lubricant is interposed between them. Therefore, their friction resistance is smaller than a contact coefficient of the O-ring made of rubber and the like, and the link plate and will not hamper the smooth bending of the chain. Then, the O-rings 12 and 13 press-contact the respective inner and outer link plates 2 and 3 without rotating relative to the plates, so that they reduce a leak of lubricant within the bearing section A to the outside, prevent dust such as powders of iron ore, coals and cokes from invading, and keep the smooth bending of the chain for a long period of time.

Then, at the time of maintenance of every predetermined use, the grease gun is applied to the greasing grease nipple 21 from the outside of the seal chain 1 to inject grease at predetermined pressure. The grease injected from the grease nipple 21 flows into the bearing section A through the gap c, increases the pressure of the used grease in the bearing section A and opens the degreasing grease nipple 22 to discharge the used grease. At this time, a clog of the greasing hole hardly occurs even if the grease is solidified because the greasing grease nipple 21 and the degreasing grease nipple 22 are both disposed near the bearing section A where pressure may be applied directly to the bearing section. Furthermore, the used grease is completely replaced with the new grease, and no lubricant failure occurs due to the remained used grease because the greasing device 21 and the degreasing device 22 are positioned on opposite sides from each other with the bearing section A between them. Still more, there is no possibility of bursting the sealing members 6A and 6B because the pressure in injecting the grease escapes from the degreasing device 22 on the opposite side.

Next, a partially modified embodiment will be explained based on FIGS. 4 through 7. It is noted that the same components as those in the previous embodiment will be denoted by the same reference numerals and an explanation thereof will be omitted.

Figure 4:
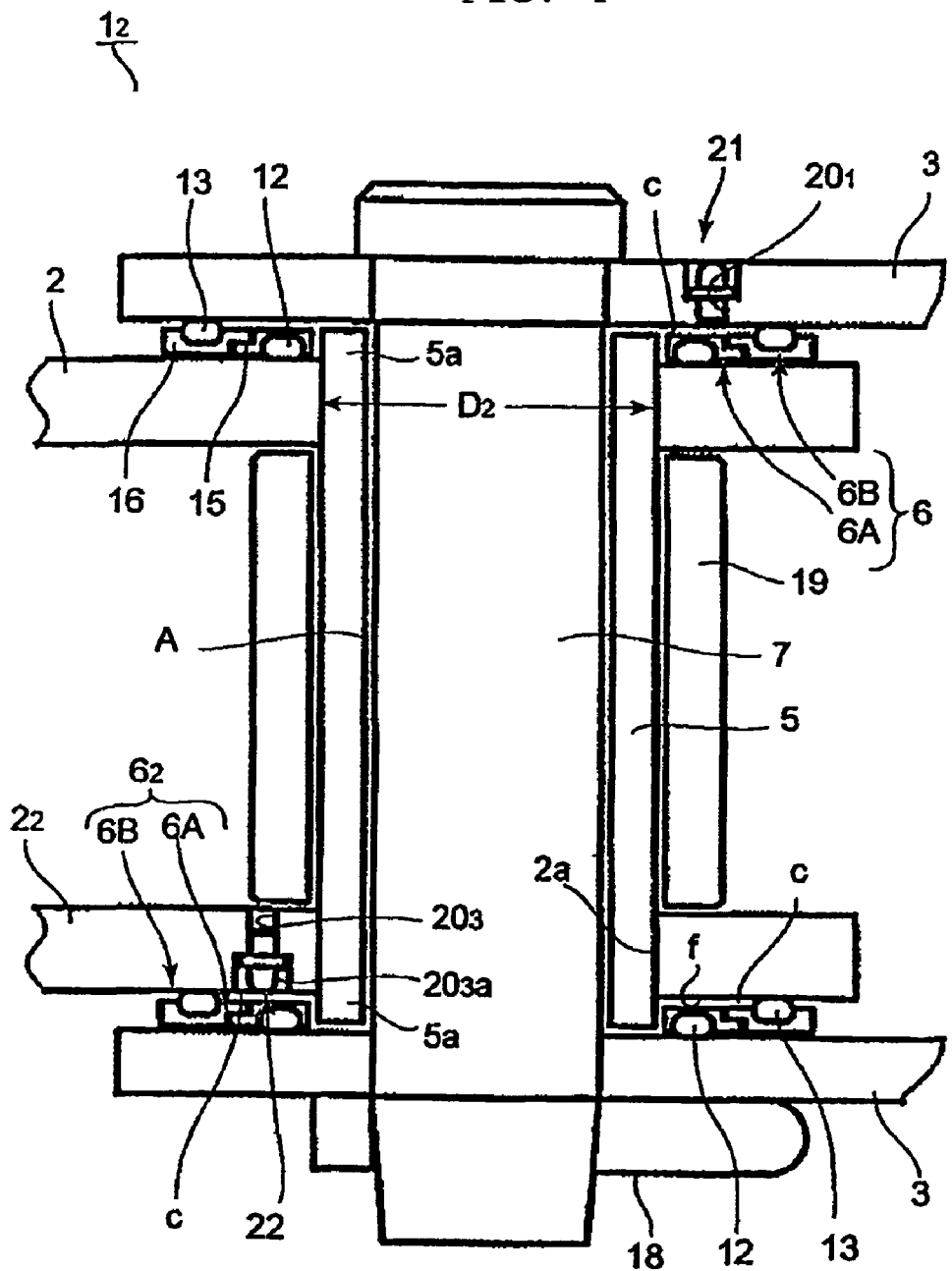
FIG. 4 is a section view showing the seal chain partially modified.

FIG. 4 shows an embodiment in which the degreasing nipple 22 is attached to the inner link plate 2. As compared to the previous embodiment, while the greasing device 21 and the sealing device 6 on the side of the greasing device (upper part in the figure) of the O-ring 12 are the same, the degreasing device 22 is different from the sealing device $6_2$. That is, a through hole $20_3$ is perforated through the inner link plate $2_2$ on the side distant from the greasing device 21 with the bearing section A between them so that the counter bore $20_3a$ faces the side of the sealing means $6_2$ and the grease nipple 22, i.e. degreasing device, is attached to the through hole $20_3$ from the counter bore $20_3a$. The same one with the grease nipple on the greasing side is used for the degreasing grease nipple 22.

The sealing means $6_2$ on the side of the degreasing device is disposed so that the O-ring 12 of the inner sealing member 6A contacts the outer link plate 3 and the O-ring 13 of the outer sealing member 6B contacts the inner link plate $2_2$. That is, although the sealing device on the greasing side and the sealing device on the degreasing side are disposed so as to be mirror-symmetrical (back to back) from each other in the previous embodiment, both sealing devices 6 and $6_2$ are disposed so as to face in the same direction (parallel) in this seal chain $1_2$. Thereby, while the sealing device 6 on the greasing side has the gap c between the outer link plate 3 in the same manner with the previous embodiment, the sealing device $6_2$ on the degreasing side has a gap c between an outer face f of the inner link plate $2_2$.

Still more, the through holes $20_2$ are disposed at a face between the pair of bushing holes $2a$ of the inner link plate $2_2$, within a width of diameter $D_2$ of the bushing hole and corresponding to the gap c, i.e., on the inner diametric of the outer O-ring 13 in the same manner as in the previous embodiment (see FIG. 2). Thereby, an influence of the through hole $20_3$ given to the strength of the inner link plate $2_2$ is minimized.

When grease is injected by the grease gun through the greasing grease nipple 21, the new grease flows into the bearing section A through the gap c and the used grease in the bearing section is pushed out to the opposite side and is discharged out of the degreasing grease nipple 22 through the gap c.

Figure 5:
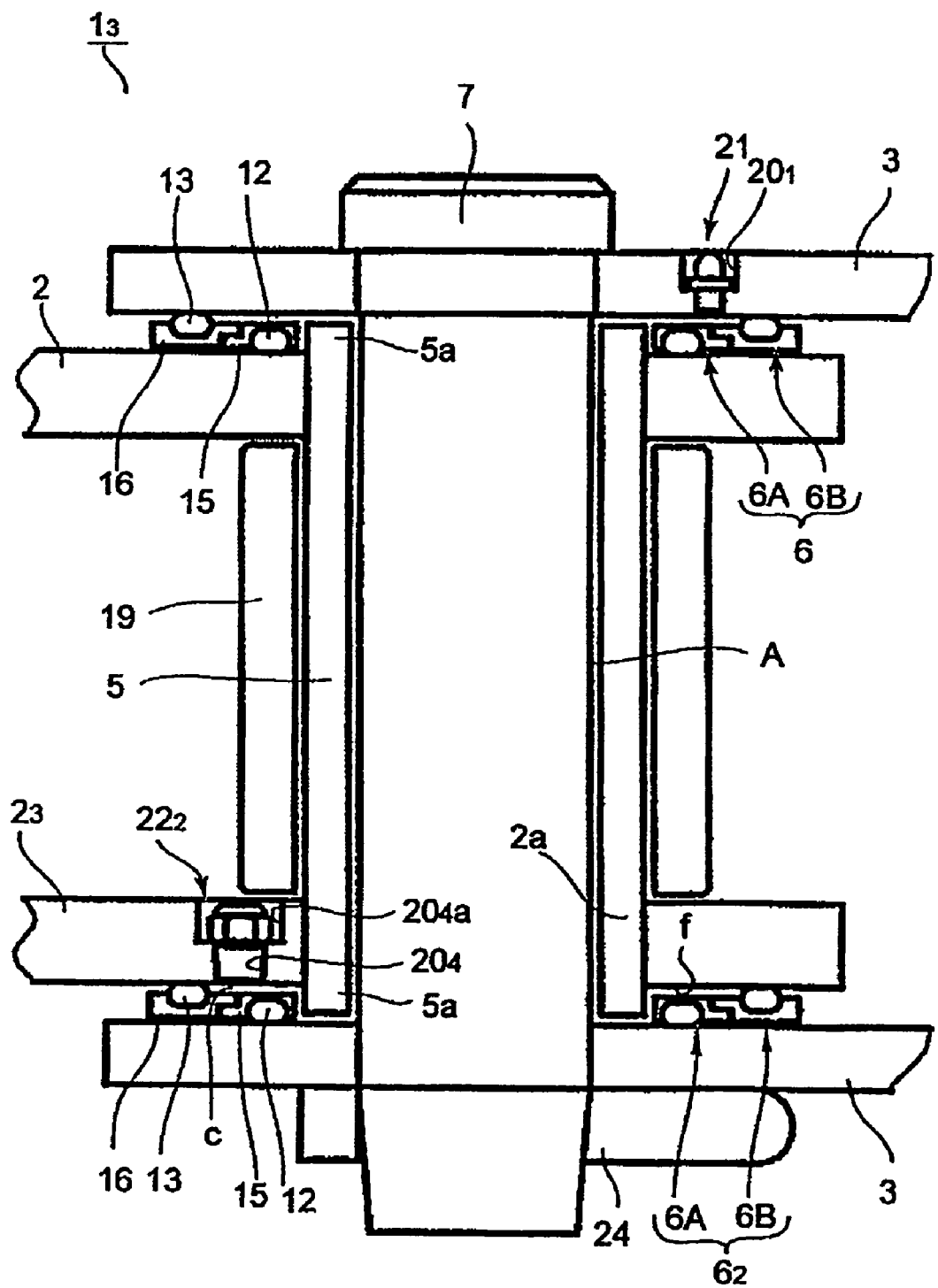
FIG. 5 is a section view showing the seal chain partially modified further.

FIG. 5 shows a still modified embodiment in which the degreasing device differs from the O-ring 12 shown in FIG. 4. In the seal chain $1_3$, a through hole $20_4$ that is larger than the through hole $20_1$ on the greasing side is perforated through the inner link plate $2_3$ on the degreasing side. Then, the inner link plate $2_3$ is assembled so that a counter bore $20_4a$ of the through hole $20_4$ faces the inner side of the chain (it is located on the opposite side of the link plate from that shown in FIG. 4) and a grease nipple $22_2$, i.e., degreasing device, is attached from the side of the counter bore $20_4$. The grease nipple $22_2$ is a relief valve type larger than the grease nipple 21 on the greasing side and opens at relatively low pressure to discharge the used grease within the bearing section A at a relatively large flow rate.

The grease nipple $22_2$ allows a large amount of the used grease to be discharged at a low resistance out of the large degreasing grease nipple $22_2$ at relatively low pressure when grease is injected from the greasing side grease nipple 21 and troubles such as clog of the grease and burst of the sealing members to be reduced. It is noted that the large degreasing grease nipple $22_2$ is applicable not only to the present embodiment but also to the seal chain 1 shown in FIG. 1

Figure 6:
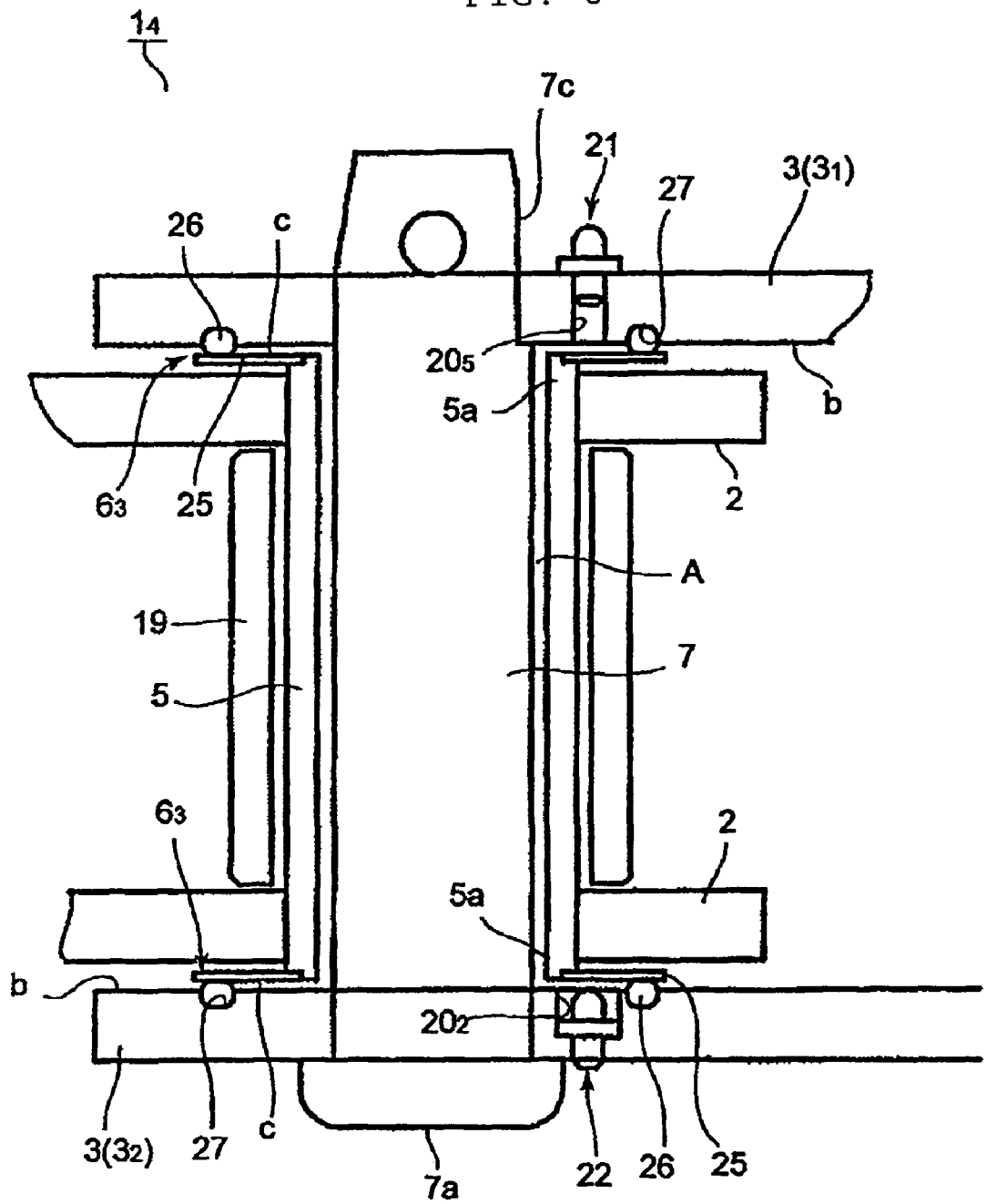
FIG. 6 is a section view showing a seal chain of another (second) embodiment.

FIG. 6 is a section view showing an embodiment in which the sealing member is modified. Similarly to the embodiment shown in FIG. 1, the greasing grease nipple 21 and the degreasing grease nipple 22 are attached to the outer link plate 3. The sealing means $6_3$ is composed of a ringed plate (plate member) 25 and an O-ring 26. The plate 25 is made from metal or synthetic resin that are low frictional materials similar to the holding members (15, 16) described above. A ringed concave groove 27 is formed on the outer link plate 3 so as to surround the pin 7 and the ringed concave groove 27 holds the O-ring 26. The plate 25 is secured by the protruding portion 5a, and the O-ring 26 contacts the plate 25, thus creating a gap c between the plate 25 and an inner face b of the outer link plate 3 and a seal of the bearing section A. It is noted that the O-ring 26 is not required to be circular in section, and may have a lip such as shapes of X, V, U and W.

A through hole $20_5$ perforated through the other outer link plate $3_1$ has a uniform diameter (that is, it has no counter bore) and is attached with the grease nipple 21, i.e., greasing device, from the outer side of the outer link plate $3_1$. Accordingly, the grease nipple is attached to the counter bore so that the grease nipple does not protrude out of the link plate in the other embodiments, the grease nipple 21 of this embodiment protrudes out of the outer face of the link plate.

In the seal chain $1_4$, grease is similarly supplied to the bearing section A through the gap c, and used grease within the bearing section A is discharged out of the degreasing grease nipple 22 through the gap c on the opposite side also when the new grease is supplied from the greasing grease nipple 21. Then, the O-ring 26 made of rubber is held in a body by the outer link plate 3 and rotates relatively with the plate 25 integrated with the bush 5 when the seal chain $1_4$ bends.

It is noted that in the present embodiment, although the greasing device 21 is disposed on the side of the edge of the pin 7 and the degreasing device 22 is disposed on the side of the head $7a$ of the pin 7, it is possible to arbitrarily set whether the greasing device or the degreasing device is disposed on which side. Furthermore, while the chamfer $7c$ is formed on the pin 7 to stop turning between the outer link plate 3, it is also applicable to the other embodiments.

Figure 7:
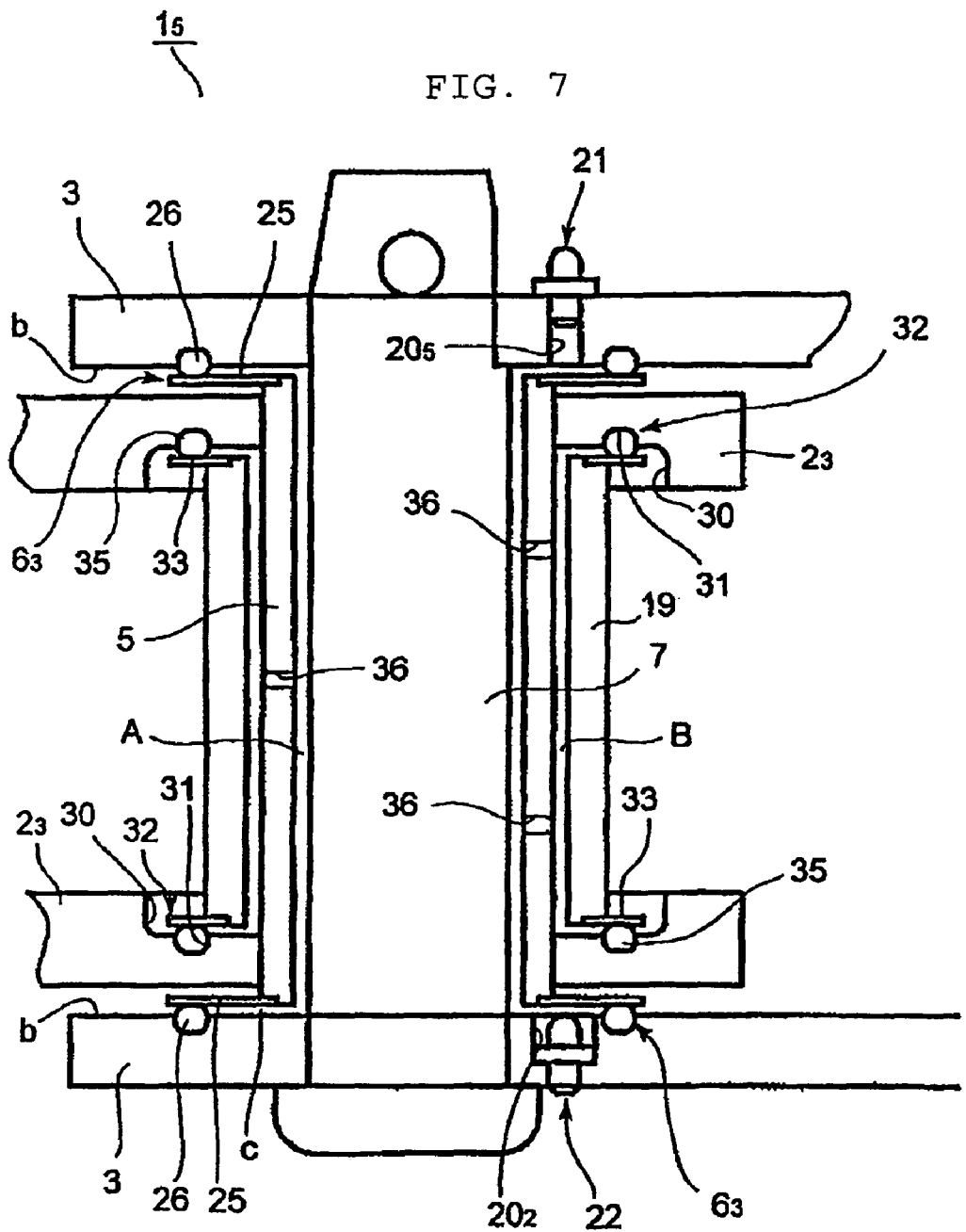
FIG. 7 is a section view showing the seal chain of the second embodiment partially modified.
Figure 8:
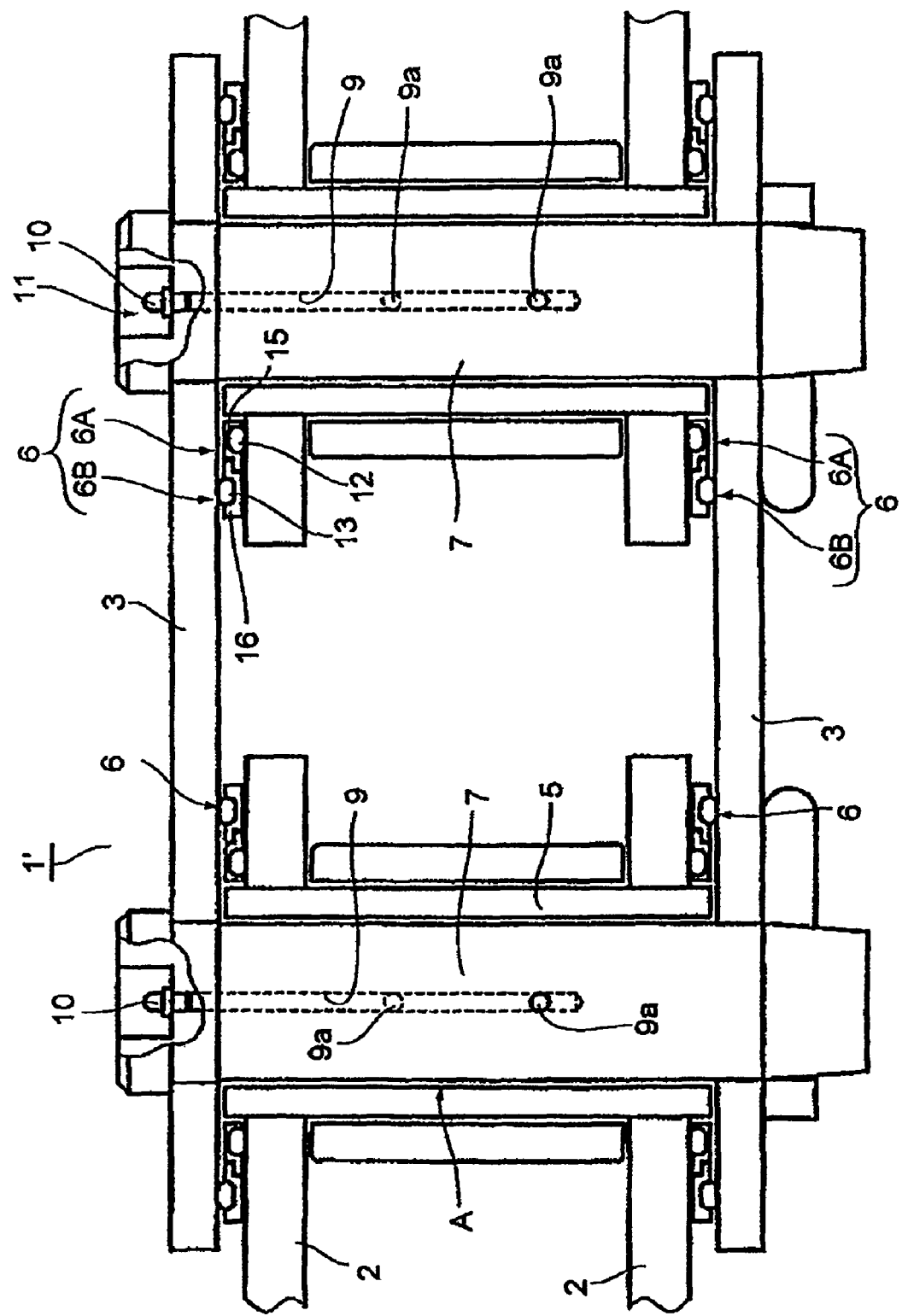
FIG. 8 is a section view showing a prior art seal chain.

FIG. 7 shows a seal chain $1_5$ according to an embodiment in which a sealing device is disposed also in a roller 19. The other parts are the same with the seal chain $1_4$ shown in FIG. 6. A disk-like shallow recess 20 having a predetermined radius is formed on an inner face of the inner link plate $2_3$ and a ringed concave groove 31 centering on the bush 5 is formed on a bottom face of the recess 30.

The roller sealing device 32 is similar to the bush sealing device $6_3$ and has a ringed plate (plate member) and an O-ring 35. The O-ring 35 is held by the concave groove 31, the plate 33 is secured by an end of the roller 19 and the whole sealing device 32 is stored within the recess 30.

Then, lubricant such as grease is supplied to a bearing section B between the roller 19 and the bushing 5 and the sealing device 32 seals it. Thereby, similarly to the bearing section A between the bushing 5 and the pin 7, it enables the roller 19 to smoothly turn with respect to the bushing 5, smoothes engagement with a sprocket, lowering noise, and can maintain this state for a long period of time.

In the present embodiment, a plurality of through holes 36 is formed through the bushing 5 so that both bearing sections A and B communicate. Thereby, when the grease is supplied to the bearing section A by injecting the grease from the greasing grease nipple 21, a part of the grease is also supplied to the bearing section B via the through holes 36. At this time, although used grease within the bearing section A is discharged out of the degreasing nipple 22, used grease within the bearing section B is discharged out between the O-ring 35 and the plate 33.

It is noted that a degreasing grease nipple may be provided in corresponding to the sealing device 32 of the inner link plate 2. It is also needless to say that it is possible to arrange so that no lubricant is supplied to the bearing section B without creating the through holes 36.

INDUSTRIAL APPLICABILITY

While the seal chain of the invention is suitably used as an endless unloading conveyor chain such as a bucket elevator and a pan conveyor for continuously conveying bulks by attaching buckets, the use thereof is not limited to that and may be used as other conveyor chains such as a slat conveyor, a slab conveyor or another conveyor for water treatment, for raking, for sand sedimentation and sedimentation pond and for a dust conveyor. It is also similarly applicable to a power transmitting seal chain such as those for motorcycles and timing chains.

The invention claimed is:

1. A seal chain comprising:
   outer links each comprising a pair of pins and a pair of outer link plates coupled by said pins;
   inner links each comprising a pair of bushings and a pair of inner link plates coupled by said bushings, said pins being rotatably inserted through said bushings so as to alternately link said inner links with said outer links;
   sealing devices each interposed between a respective one of said outer link plates and a respective one of said inner link plates so as to seal lubricant in a respective bearing section formed between each pin and each bushing, a first one of said pair of outer link plates of each of said outer links having a greasing through-hole perforated therethrough so as to communicate with said respective bearing section; and
   a greasing device attached to said greasing through-hole and configured to supply the lubricant from a side of an outer face of said first one of said pair of said outer link plates to said bearing section.

2. The seal chain according to claim 1, wherein a second one of said pair of outer link plates of each of said outer links on a side separated from said greasing device has a degreasing through-hole perforated therethrough so as to communicate with said bearing section; and
   a degreasing device is attached to said degreasing through-hole and is configured to discharge the lubricant in said bearing section when the lubricant is supplied from said greasing device.

3. The seal chain according to claim 1, wherein said degreasing through-hole is disposed between a pair of pin holes of said second one of said outer link plates, and within a widthwise range of a diameter of each pin hole.

4. The seal chain according to claim 2, wherein:
   said bushing has protruding portions, each of said protruding portions protruding past an outer face of a respective one of said inner link plates;
   each of said sealing devices has two rows comprising an inner diametric sealing member and an outer diametric sealing member arranged in a radial direction so as to surround said protruding portions of said bushing;
   said inner diametric sealing member has an inner diametric O-ring and a ringed inner diametric holding member for holding said inner diametric O-ring;
   said outer diametric sealing member has an outer diametric O-ring and a ringed outer diametric holding member for holding said outer diametric O-ring;
   said inner diametric holding member and said outer diametric holding member abut each other so that said inner diametric O-ring and said outer diametric O-ring maintain contact with one of said inner link plates and one of said outer link plates, respectively;
   each of said sealing devices being arranged so that said inner diametric O-ring contacts said inner link plate, and so that said outer diametric O-ring contacts said outer link plate; and
   each of said sealing devices being arranged so that a predetermined gap exists at least between a back face of said inner diametric holding member and an inner face of said outer link plate.

5. The seal chain according to claim 2, wherein:
   said bushing has protruding portions, each of said protruding portions protruding past an outer face of a respective one of said inner link plates;
   each of said pair of outer link plates is disposed so as to face an outer face of a respective one of said pair of inner link plates;
   a ringed first concave groove is formed on an outer diametric side of said greasing through-hole on an inner face of a first one of said pair of outer link plates facing an outer face of a respective one of said pair of inner link plates, said greasing through-holes being perforated through said ringed first concave groove;
   a ringed second concave groove is formed on an outer diametric side of said degreasing through-hole on an inner face of a second one of said pair of outer link plates facing an outer face of a respective one of said inner link plates, said degreasing through-hole being perforated through said ringed second concave groove;
   a first one of said sealing devices interposed between a first one of said pair of outer link plates and a first one of said pair of inner link plates has a ringed first plate member fixed to a first one of said protruding portions of said bushing and a first O-ring held in said first concave groove of said outer link plate;
   said first O-ring being disposed so as to contact said first plate member and to create a gap between said first plate member and said inner face of said first one of said pair of outer link plates;
   a second one of said sealing devices interposed between a second one of said pair of outer link plates and a second one of said inner link plates has a ringed second plate member fixed to a second one of said protruding portions of said bushing and a second O-ring held in said second concave groove of said outer link plate; and
   said second O-ring being disposed so as to contact said second plate member and to create a gap between said second plate member and said inner face of said second one of said outer link plates.

6. The seal chain according to claim 1, wherein a first one of said pair of inner link plates of each of said inner links on a side separated from said greasing device has a degreasing through-hole perforated therethrough so as to communicate with said bearing section; and
   a degreasing device is attached to said degreasing through-hole and is configured to discharge the lubricant in said bearing section when the lubricant is supplied from said greasing device.

7. The seal chain according to claim 6, wherein said greasing through-hole and said degreasing through-hole are disposed between a pair of bushing holes of a respective one of said inner link plates, and within a widthwise range of a diameter of each of said bushing holes, respectively.

8. The seal chain according to claim 6, wherein:
   said bushing has protruding portions, each of said protruding portions protruding past an outer face of a respective one of said inner link plates;

each of said sealing devices has two rows comprising an inner diametric sealing member and an outer diametric sealing member arranged in a radial direction so as to surround said protruding portions of said bushing;

said inner diametric sealing member has an inner diametric O-ring and a ringed inner diametric holding member for holding said inner diametric O-ring;

said outer diametric sealing member has an outer diametric O-ring and a ringed outer diametric holding member for holding said outer diametric O-ring;

said inner diametric holding member and said outer diametric holding member abut each other so that said inner diametric O-ring and said outer diametric O-ring maintain contact with one of said inner link plates and one of said outer link plates, respectively;

said inner diametric O-ring of a first one of said sealing devices contacts a respective one of said inner link plates and said outer diametric O-ring a said first one of said sealing devices contacts a respective one of said outer link plates, said first one of said sealing devices is located on a side where said greasing device is disposed;

said inner diametric O-ring of a second one of said sealing devices contacts a respective one of said outer link plates and said outer diametric O-ring of said second one of said sealing devices contacts a respective one of said inner link plates, said second one of said sealing devices is located on a side where said degreasing device is disposed;

said first one of said sealing device is arranged so that a predetermined gap exists at least between a back face of said inner diametric holding member and an inner face of said respective one of said outer link plates; and said second one of said sealing devices is arranged so that a predetermined gap exists at least between a back face of said inner diametric holding member and an outer face of said respective one of said inner link plates.

9. The seal chain according to claim 1, wherein said greasing through-hole is disposed between a pair of pin holes of a respective one of said inner link plates, and within a widthwise range of a diameter of each of said pin holes, respectively.

10. The seal chain according to claim 1, further comprising:
a roller rotatably and idly fitted around said bushing; and
a roller sealing device interposed between a respective one of said inner link plates and said roller so as to seal lubricant in a roller bearing section formed between said bushing and said roller, said bushing having a communicating section configured to allow said bearing section to communicate with said roller bearing section.

* * * * *